May 6, 1941. H. SELITZKY 2,240,721

COFFEE MAKING APPARATUS

Filed Nov. 19, 1937

INVENTOR.
Henry Selitzky
BY
S. J. Coo.
ATTORNEY.

Patented May 6, 1941

2,240,721

UNITED STATES PATENT OFFICE 2,240,721

COFFEE MAKING APPARATUS

Henry Selitzky, Brooklyn, N. Y.

Application November 19, 1937, Serial No. 175,367

11 Claims. (Cl. 53—3)

The improvements relate primarily to apparatus for preparing coffee as a beverage by passing water through the ground or pulverized coffee bean, but their use is not limited to this, and they may be employed in the filtration or straining of various liquids containing solids in a finely divided state either as an incident to the preparation of a beverage or otherwise.

Among their objects are to provide a highly efficient, relatively fast working and easily cleansed strainer or filter which will not become clogged or fouled in use and to so regulate the flow and pressure of the liquid that the filter and finely divided material will not be subject to pressure tending to interfere with the efficient operation of the former and the filtrate will be of uniform strength and quality and substantially free from sediment, while at the same time a maximum of the essence of the coffee or other finely divided solid will be extracted. Other objects and advantages will appear to those skilled in the art.

The improvements are illustrated in the accompanying drawing, showing an illustrative embodiment, in which—

Figure 1:
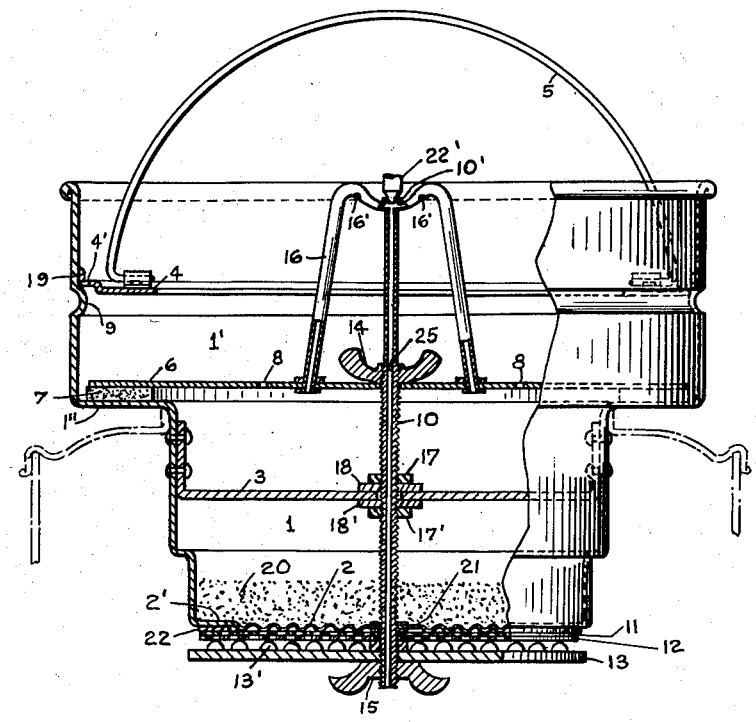
Figure 1 is a medial vertical section partly in elevation of a coffee making and filtering apparatus embodying the improvements.
Figure 2:
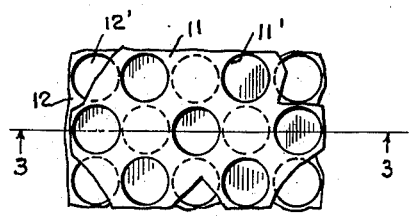
Figure 2 is an enlarged fragment in plan of the filter plates.
Figure 3:
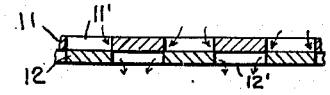
Figure 3 is a vertical section on the line 3—3 of Figure 2 on the same scale.

The lower bowl 1, which like the other parts of the vessel and the disks or diaphragms is preferably made of sheet metal, receives the coffee or other finely divided material on its bottom 2, which is corrugated and perforated to permit the free passage of water therethrough. It has a flat bar or strap 3 fixed thereon and extending across it above the coffee holding compartment and a removable ring or annular flange 4 in its upper part supported on the annular bead 9 in the upper bowl 1', which annulus is provided with a bail 5 by which it may be lifted from the bowl or the bowl may be lifted with it when its marginal notches 4' are not aligned with the lugs 19 above them on the inner surface of the bowl. It will be understood that a suitable cover (not shown) may be provided at the top and that the lower part of the bowl should be set into a vessel extending below it (see dotted lines Fig. 1) and provided with a valved spout or faucet for drawing off the liquid therefrom. All these parts are of ordinary construction and therefore need not be further described.

Figure 4:
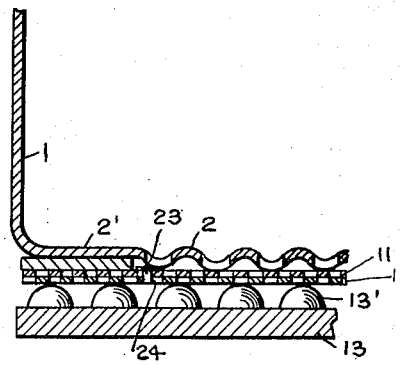
Figure 4 is an enlarged vertical section of a fragment taken from the lower left corner of the construction as shown in Figure 1.

A removable disk 6 covers the lower bowl 1 and rests upon a packing ring 7 on the flange or step 1'' joining the lower bowl and the upper enlarged bowl 1'. This disk has in it two or more small openings 8, through which the water poured into the top of the bowl must pass to the lower bowl, so that when a quantity of hot water is poured into the upper bowl it will pass slowly into the lower bowl and at a rate of flow not greatly in excess of the rate of filtration and discharge, thereby preventing the rapid filling of the lower bowl and the building up of any considerable pressure on the filter and the loose material thereon. The size of the holes 8 will therefore be governed and determined by the rate of filtration and the size and capacity of the lower bowl. In the illustrative embodiment, the lower bowl is approximately 8 inches in diameter and 4½ inches in depth, the upper bowl approximately 12 inches in diameter and about the same depth and the holes 8 are $\frac{3}{16}$ inch in diameter and four in number. This, with a filter such as that shown will give the desired results, the filter and other parts as shown in Fig. 4 being about one-third larger than their actual size.

A tubular handle 16 secured to the disk 6 and extending to the top of the upper bowl is provided for lifting and lowering the said disk 6, providing an air vent for the lower bowl and holding and venting the upper end of the hollow post 10. It has small vent openings 16' at its top under side and is open to the interior of the lower bowl at its lower ends. In this manner the air from the lower bowl and the filtrate receiving container is vented slowly as they fill and a certain balance between them maintained.

The hollow post 10 extends through the disk 6, the diaphragm 3, the corrugated bottom 2, the filter plates 11 and 12 and the pressure plate 13 on the bottom thereof. It is threaded exteriorly and receives the thumb nuts 14 and 15, the former at the top of its threaded portion and the latter at its lower end. These thumb nuts bear against the upper side of the disk 6 at the upper end of the threaded portion of the post 10 and the under side of the pressure plate 13 at its lower end, and in this manner the disk and plate and removable parts between them are secured. The post is positioned and secured centrally of the bowl by the flat bar 3 through which it passes and to which it is secured by means of the upper nut 17 and lower nut 17' with packing rings 18, 18' between them, all threaded on the said tubular post.

By making the post 10 hollow an important function in addition to venting is obtained, namely, the discharge into a receiving vessel or the bottom of the apparatus acting as such of a certain volume of clear water along with the first flow of impregnated liquid passing through the coffee or the like and through the filter. Thus, when the vessel is filled at the top the water will flow through the holes 8 of the diaphragm 6, through the finely divided material 20 in the bottom of the bowl 1 and through the filter plates, while at the beginning when the upper bowl is filled a small quantity of clear water will flow through the bore of the post 10 and mix therewith so as to dilute it to a sufficient extent to reduce its strength to a normal degree. To close the upper end of the post 10 this end is formed into a valve seat at 10' and a valve plug 22' adapted to seat therein is provided. This plug may be a separate part or may be attached to the under side of a cover so as to be seated therewith.

To accomplish the proper result, the amount of coffee required to make a satisfactory beverage from the water which the upper bowl will contain—in the present case about two gallons— must be placed in the bottom of bowl 1 above the filter, as indicated at 20, and the water poured in at the top until the upper bowl is full from the bottom disk 6 to the top. Then as the water starts to pass through this loose material and the filter and is impregnated with the coffee and discharged, a small column of clear water will be discharged therewith through the tubular post 10, and until the level of water has fallen below the top of the tube or the plug 22' is seated. The size and exact location of this clear water tube is, of course, important, and must be governed by the capacity of the bowls and the filter, the strength of the liquid coffee desired and the rate of liquid flow, but the location and size shown in Fig. 1 of the drawing are productive of satisfactory results in the apparatus as shown.

The filter is pressed against an annular washer 22 between its outer edges and the inturned, annular, imperforate bottom flange 2' of the bowl 1 forming part of its bottom and from which the perforate bottom 2 extends. This filter consists of the two plates 11 and 12, in close contact with each other and provided with perforations 11' and 12' respectively of the same size and out of alignment, so that liquid passing through must pass between the opposing surfaces of the plates 11 and 12 and cannot pass through the openings except in this manner. Perforations $\frac{1}{16}$ inch in diameter about sixty-four to the square inch uniformly spaced have been found satisfactory, but the number and size of the perforations may be varied to a certain extent to vary the result or compensate for variations in the granular or pulverulent coffee. Likewise the perforations may be rectangular, oblong or of any other suitable shape other than round and may vary in size in one or both plates.

The pressure plate 13 has thereon numerous small upwardly extending cones 13' which are in contact with the under plate 12 of the filter throughout its area. In this manner, when the filter is assembled and the pressure nut 15 tightened, the filter plates are pressed against the corrugated and perforate bottom 2 and into close contact with each other throughout their entire area, and any free passage of liquid therethrough prevented. A compressible gasket 21 is located on the post 10 between the upper filter plate and the bottom 2 and another 22 between the said filter plate and the flange 2' of the bottom. Short dowels 23 on the upper plate fitting into holes 24 in the lower plate insure the proper position of the said plates and their perforations laterally with respect to each other.

It will be seen that by varying the pressure on the filter plates, by means of the wing nut 15, the speed and filtering action of the filter may be varied, and also that by releasing the pressure the filter may be cleansed with water without removing the filter parts. Other functions and advantages will be apparent to those familiar with devices of this character.

The peculiar construction and arrangement of the filter is an important phase of the present improvements. By employing a plurality of plates with numerous small perforations out of alignment, but with the edges of the perforations very close to alignment, a rapid and effective filtration of the liquid passing therethrough is obtained, and without clogging. This arrangement also permits the adjustment of the filter to meet various conditions and to secure varied results. It also permits the filter to be cleansed without taking it down and dispenses entirely with filtering paper or cloth and eliminates the difficulties and labor involved in the use of such filtering media. Another important feature is found in the provisions for venting the air and regulating and balancing the pressure above and below the filter and the regulation and control of the supply of liquid, so that the filtering operation will be rapid and effective at all stages and packing of the finely divided material to which the liquid is subjected before filtration avoided. In their primary use the improvements extract a maximum of the essence of the coffee and produce a clear beverage of uniform strength practically free from grounds in a minimum period of time.

The plate 13 provides an outlet around its edges for the filtered liquid, but if desired, it may have one or more openings therethrough for that purpose. The bottom 2 of the bowl 1 is preferably integral with the bowl, but the filter plates and pressure plate are separable and removable.

It will be understood that various modifications and additions of the embodiment shown and described may be made without departing from the scope of the invention. One such modification is the provision of a small hole 25 in the tubular post 10 just above the diaphragm 6 and arranged to be opened and closed by the nut 14, which can be screwed down slightly after it is brought into contact with the upper surface of the diaphragm due to the slight resiliency of the diaphragm, to open this hole. This will provide a limited dilution of the brewed filtrate until the upper bowl is practically emptied, and may be closed by raising the nut slightly before the upper bowl is refilled for a second "brewed"; but as its diameter will be less than the diameter of the bore of the post the flow of liquid therethrough will not interfere with the venting of air through said bore. Instead of venting the lower bowl through the handle 16, thus requiring the extension of the handle to the top of the bowl, a small tube may be run down through the top of the hollow post 10 with its lower end passed through the wall of said post just below the diaphragm 6 and its upper end at the top thereof. In this case the bore of the post would be substantially greater in diameter than the external diameter of this venting tube so as to provide an annular passage for liquid at the beginning of the operation and for air thereafter.

What I claim is:

1. In apparatus of the character indicated, a receptacle for finely divided material and liquid to be passed therethrough, an outlet for said liquid after it has passed through said material and a filter between said material and outlet comprising a plurality of plates superposed and having parallel opposing surfaces each having numerous small perforations therein out of alignment but arranged with their edges in close proximity to those of another plate, and means for maintaining said plates in fixed position and relation to each other whereby said liquid is caused to pass through the perforations of one plate, between the surface of said plate and the next and through the perforations of the second plate.

2. In apparatus of the character indicated, a receptacle for finely divided material and liquid to be passed therethrough, an outlet for said liquid after it has passed through said material and a filter between said material and outlet comprising a plurality of plates superposed and having parallel opposing surfaces each having numerous small perforations therein out of alignment but arranged with their edges in close proximity to those of another plate, and means for maintaining said plates in fixed position and relation to each other whereby said liquid is caused to pass through the perforations of one plate, between the surface of said plate and the next and through the perforations of the second plate and means for pressing said plates together.

3. In apparatus of the character indicated, a receptacle for finely divided material and liquid to be passed therethrough, an outlet for said liquid after it has passed through said material and a filter between said material and outlet comprising a plurality of metallic contacting plates each having numerous small perforations therein out of alignment but arranged with their edges in close proximity to those of another plate, and means for maintaining said plates in fixed position and relation to each other whereby said liquid is caused to pass through the perforations of one plate, between the surface of said plate and the next and through the perforations of the second plate and means for pressing said plates together and for varying the pressure between the plates.

4. In apparatus of the character indicated, a receptacle for finely divided material and liquid to be passed therethrough, an outlet for said liquid after it has passed through said material and a filter between said material and outlet comprising a plurality of plates having opposed contact surfaces each having numerous small perforations therein out of alignment but arranged with their edges in close proximity to those of another plate, and means for maintaining said plates in fixed position and relation to each other whereby said liquid is caused to pass through the perforations of one plate, between the surface of said plate and the next and through the perforations of the second plate at least a portion of said liquid passing between the abutting edges of the openings of said plates.

5. In apparatus of the character indicated, a receptacle for finely divided material and liquid to be passed therethrough, an outlet for said liquid after it has passed through said material and a filter between said material and outlet comprising a plurality of plates of rigid material closely opposed each having numerous small perforations therein out of alignment but arranged with their edges in close proximity to those of another plate, and means for maintaining said plates in fixed position and relation to each other whereby said liquid is caused to pass through the perforations of one plate, between the surface of said plate and the next and through the perforations of the second plate, a partition dividing said receptacle into upper and lower compartments for the reception of untreated liquid and the finely divided material respectively, said partition having small openings therein for the retarded passage of liquid therethrough into the lower compartment, and a restricted air vent device communicating between said lower compartment and the upper part of said upper compartment.

6. In apparatus of the character indicated, a receptacle for finely divided material and liquid to be passed therethrough, an outlet for said liquid after it has passed through said material and a filter between said material and outlet comprising a plurality of plates of rigid material closely opposed each having numerous small perforations therein out of alignment but arranged with their edges in close proximity to those of another plate, and means for maintaining said plates in fixed position and relation to each other whereby said liquid is caused to pass through the perforations of one plate, between the surface of said plate and the next and through the perforations of the second plate, a partition dividing said receptacle into upper and lower compartments for the reception of untreated liquid and the finely divided material respectively, said partition having small openings therein for the retarded passage of liquid therethrough into the lower compartment, and a conduit communicating between the upper part of said upper compartment at a point beyond the filter.

7. In a device of the character set forth a receptacle for liquid and a finely divided solid material in the lower part thereof, said receptacle having a bottom outlet, and a filtering device at said outlet through which the liquid passes after passing through the solid material and by which said solid material is excluded from the liquid, said filtering device comprising plates in surface contact with one another provided with numerous small openings therethrough, the openings in one plate being out of alignment with the openings in an adjacent contacting plate but arranged with edges in close proximity to one another.

8. In a device of the character set forth a receptacle for liquid and a finely divided solid material in the lower part thereof, said receptacle having a bottom outlet, and a filtering device at said outlet through which the liquid passes after passing through the solid material and by which said solid material is excluded from the liquid, said filtering device comprising plates in surface contact with one another provided with numerous small openings therethrough, the openings in one plate being out of alignment with the openings in an adjacent contacting plate but arranged with edges in close proximity to one another, and means for pressing said plates against each other and for varying the pressure between them.

9. In a device of the character set forth a receptacle for liquid and a finely divided solid material in the lower part thereof, said receptacle having a bottom outlet, and a filtering device at said outlet through which the liquid passes after passing through the solid material and by which said solid material is excluded from the liquid, said filtering device comprising plates in surface contact with one another provided with numerous small openings therethrough, the openings in one plate being out of alignment with the openings in an adjacent contacting plate but arranged with edges in close proximity to one another, and means for connecting said plates and for holding them and their openings in fixed position and against lateral movement with respect to one another.

10. In apparatus of the character indicated, a receptacle for finely divided material and liquid to be passed therethrough, an outlet for said liquid after it has passed through said material and a filter between said material and outlet comprising a plurality of plates superposed and having parallel opposing surfaces free of obstruction each having numerous small perforations therein substantially out of alignment with but arranged with their edges in close proximity to those of another plate, and means for maintaining said plates in fixed position and relation to each other whereby said liquid is permitted to pass directly through the perforations of one plate, between the surface of said plate and the next and through the perforations of the second plate, and a mat of the said finely divided material is formed on the first plate.

11. In apparatus of the character indicated, a receptacle for finely divided material and liquid to be passed therethrough, an outlet for said liquid after it has passed through said material and a filter between said material and outlet comprising a plurality of plates superposed and having parallel opposing surfaces free of obstruction each having numerous small perforations therein substantially out of alignment with but arranged with their edges in close proximity to those of another plate, and means for maintaining said plates in fixed position and relation to each other whereby said liquid is permitted to pass directly through the perforations of one plate, between the surface of said plate and the next and through the perforations of the second plate and a mat of the said finely divided material is formed on the first plate, and means for holding said plates with their opposing surfaces in contact.

HENRY SELITZKY.